Jan. 9, 1940.　　　　K. MAHNKE　　　　2,186,254

MULTISPEED MOTOR CONTROL

Filed March 31, 1939.　　　2 Sheets-Sheet 1

WITNESSES:

INVENTOR
Kurt Mahnke.
BY
Paul E. Fristenmann
ATTORNEY

Jan. 9, 1940.   K. MAHNKE   2,186,254
MULTISPEED MOTOR CONTROL
Filed March 31, 1939   2 Sheets-Sheet 2

WITNESSES:   INVENTOR
E. A. McCloskey.   Kurt Mahnke.
Wm. J. Ruano   BY
   Paul E. Friedemann
   ATTORNEY Patented Jan. 9, 1940

2,186,254

UNITED STATES PATENT OFFICE 2,186,254

MULTISPEED MOTOR CONTROL

Kurt Mahnke, Forest Hills, Pa., assignor to Westinghouse Electric & Manufacturing Company, East Pittsburgh, Pa., a corporation of Pennsylvania Application March 31, 1939, Serial No. 265,157

11 Claims. (Cl. 172—179)

My invention relates to a speed control system for an electric motor. More specifically, it relates to a system which is controllable by push buttons wherein the depressing of one of the push buttons will effect automatic acceleration of the motor up to the pre-selected speed as determined by the particular push button used.

An object of my invention is to provide a control system for regulating the speed of electric motor which system incorporates timed acceleration thereby avoiding too sudden an acceleration of the motor.

Another object of my invention is to provide a speed control system for an electric motor which is operated solely by push buttons and in which any desired speed may be obtained by merely pressing the particular push button corresponding to that speed, whereby automatic acceleration from zero speed, if the motor is at a standstill, or from a slow speed, if the motor is operating at such slow speed, is acquired, the accelerating being arrested when the speed reaches the value corresponding to that selected by the particular push button.

Other objects and advantages will become more apparent from a study of the following specification when considered in conjunction with the accompanying drawings, in which.

Figure 1:
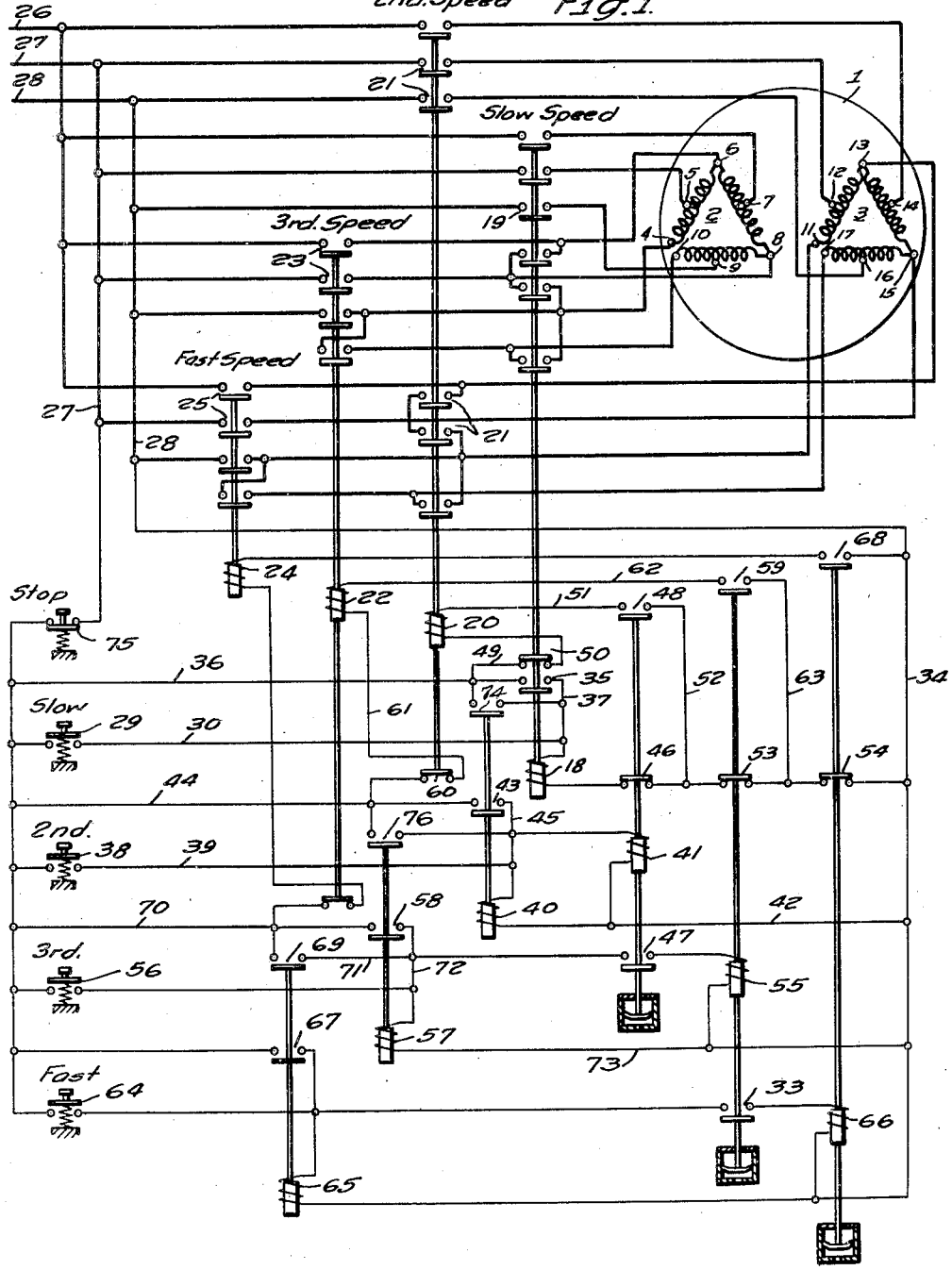
Figure 1 is a control system embodying my invention.

Referring to Figure 1, numeral 1 denotes a polyphase electric motor having a plurality of windings 2 and 3 arranged in the form of a delta as shown. It should be noted, however, that windings 2 and 3 may also be those of separate motors coupled to the same shaft. On winding 2 terminals are provided at points 4, 5, 6, 7, 8, 9, and 10. Winding 3 is provided with similar terminals 11, 12, 13, 14, 15, 16 and 17. Electric motor 1 may be a squirrel cage motor whose speed is varied by varying the number of poles, that is, by varying the connections of the stator windings.

A "slow speed" relay is provided which relay has an actuating coil 18, which, when energized, causes an upward movement of its armature and closure of a plurality of contact members 19, the effect of which is to interconnect terminals 4, 6, 8 and 10, all of which form the junction point of a Y-connected winding having a pair of parallel connected windings in each of its arms. Terminals 5, 7 and 9 thus form the line terminals for this particular winding connection. When the motor windings are so connected, slow speed operation of the motor is secured.

A "second speed" relay is provided which has an actuating coil 20 which, when energized, causes upward movement of its armature and closure of the contact elements 21 which effects a connection in winding 3 which is similar to the "slow speed" connection for the winding 2 as described above. In other words, it provides a common connection for terminals 11, 13, 15 and 17 which form the common point of the double Y-connection, while terminals 12, 14 and 16 form the line terminals of the winding.

A "third speed" relay is provided having an actuating coil 22 which, when energized, causes upward movement of the armature and closure of contact elements 23 which, in turn, provides a delta connection for the winding 2 as shown, that is, the line terminals are now 4, 6, 8 and 10, there being no other terminals interconnected.

A "fast speed" relay is provided having an actuating coil 24 which, when energized, causes an upward movement of its armature and closure of the contact elements 25 which effect a delta connection for winding 3 as shown, that is, the line terminals are now 11, 13, 15 and 17, there being no other terminals interconnected.

The incoming three-phase power supply line is indicated by numerals 26, 27, 28. When the "slow speed" push button 29 is depressed, a circuit will be completed from conductor 27 through stop switch 75, the slow speed contact members of switch 29 to conductor 30, actuating coil 18 through the closed contact members 46, 53 and 54 and conductor 34 to conductor 28. The above circuit effects energization of actuating coil 18 which causes an upward movement of its armature and the closure of contact elements 19 which effects a particular connection for winding 2 of the motor to give slow speed operation of the motor. At the same time, contact members 35 are closed by the relay, thus forming an interlock or holding circuit for actuating coil 18 through conductor 36, closed contact members 46, 53 and 54 and contact members 35. The circuit through actuating coil 18 is thus maintained.

Assume now that the second speed is desired. By depressing the "second speed" push button 38, a circuit is completed from conductor 27, through the contact members of the "second speed" push button 38, conductor 39 thence through two parallel paths, one through control relay 40 and the other through a time delay relay actuating coil 41, thence to energized conductors 42, 34 and finally to conductor 28.

Energization of actuating coil 40 causes closure of contact members 43, thus shunting the "second speed" push button and completing a holding circuit from conductors 27 and 44, contact members 43, conductor 45, control relay coil 40, conductors 42, 34 and finally to conductor 28. Since the time delay relay coil 41 is also energized, it will effect a slow upward movement of its armature, causing closure of contact members 47 and 48 and an instant thereafter, opening of contact members 46. The effect of opening of contact members 46 is to open the circuit through actuating coil 18 thereby deenergizing the same and allowing the "slow speed" contact members 19 to open thus disconnecting the "slow speed" winding connection. The effect of closure of the contact members 48 is to complete a circuit from conductor 27, 36 and 49, contact members 50, actuating coil 20, conductor 51, contact members 48, conductor 52, contact members 53, 54 to energized conductor 34.

The completion of the above circuit effects energization of actuating coil 20 which causes closure of the "second speed" contact members 21, hence effecting connection of the winding 3 so as to effect second speed operation of the motor. The effect of closing of contact members 47 is to partially prepare or set up a circuit for the next time delay relay coil 55.

Similarly, when the third speed push button 56 is depressed, a circuit will be completed through the third speed control relay coil 57 and simultaneously through the third speed time delay relay 55, the former causing closure of interlocking contact members 58 thus providing a holding circuit for the "third speed" control relay, and the latter effecting opening of contact members 53, thus deenergizing the "second speed" actuating coil 20 and nullifying the second speed motor winding connection, and, at the same time, closing contact members 59 and 33, thus completing a circuit through the "third speed" actuating coil 22 to effect closure of the third speed contact members 23 and connection of the motor windings for third speed operation. The last-mentioned circuit is as follows: from conductor 27 through conductor 44, contact members 60, conductor 61, actuating coil 22, conductor 62, contact members 59, conductor 63, contact members 54 to energized conductor 34.

Assuming now that the fast speed of operation is desired, and that the "fast speed" push button 64 is depressed. This will complete a circuit simultaneously through the "fast speed" control relay coil 65 and the time delay relay coil 66, the former closing interlocking contact members 67 to provide a holding circuit for coil 65 and the latter opening contact members 54, thus deenergizing the third speed actuating coil 22 and at the same time closing contact members 68 which completes the circuit through the "fast speed" actuating coil 24, thus effecting a connection of the motor winding to secure fast speed operation.

Assuming that the motor is at a standstill and a particular speed such as the fast speed is desired. By depressing the "fast speed" push button 64, the circuit will be completed through the fast speed control relay coil 65 which causes an upward movement of its armature, thus closing contact members 69 which completes a circuit through the third speed actuating coil 57 as follows: from conductor 27 to conductor 70, contact members 69, conductors 71 and 72, control relay coil 57, conductors 73 and 34, finally to conductor 28. Energization of control relay coil 57 causes closure of contact members 76 which likewise completes a circuit through the "second speed" control relay 40 the latter effecting closing of contact member 74 which, in turn, completes a circuit through actuating coil 18, thus closing contact members 19 and effecting a slow speed connection of the motor winding. At this time a circuit is completed from conductor 27 to conductor 44, contact members 76, time delay relay coil 41, conductors 42 and 34, finally to conductor 28. Hence, after a predetermined time interval contact members 48 will close and "second speed" relay 20 will be actuated to effect the second speed operation of the motor. At this time, another circuit will likewise be completed through conductor 70, contact members 69 and the third speed time delay coil 55 which will ultimately effect closure of contact members 59 and energization of actuating coil 22 to effect third speed operation. Again at this stage, a still further circuit will be completed through contact members 67 to the fourth speed time delay relay coil 66 which will effect closure of contact members 68 and ultimately energization of the fast speed actuating coil 24, which will effect connection of the motor winding for fast speed operation.

Thus, it will be seen that automatic timed acceleration is provided so that by merely depressing any of the push buttons the system will automatically set up in sequence successive winding connections for obtaining successively increasing speeds of the motor until the desired speed has been attained.

While it is possible to go from a lower speed to any higher speed, the system described will not allow change from a higher speed to a lower speed without first operating a stop button 75 and then operating the desired lower speed push button. When the motor is at rest it is possible to cause it to run at any desired speed merely by depressing the corresponding push button.

In summarizing, it will be seen that the operation of each of the time delay relays by its interlocking contact members partially sets up a circuit through the next succeeding higher speed time delay coil and at the same time disconnecting the previous lower speed motor connection. Also, all of the control relays have interlocking contact members so that energization of any of the control relays by depressing the corresponding push button will automatically cause energization of all of the control relays associated with the push buttons of the lower speeds. Furthermore, the time element involved in the operation of each of the time delay relays affords a restriction to the rate of acceleration of the motor, this rate, of course, being adjustable by adjusting the time delay relay dashpots or equivalent elements. One characteristic of the system illustrated in Fig. 1 is that after depressing a push button for the purpose of speeding up the motor an appreciable time interval is taken for the operation of the timing relay before the motor starts to accelerate. In some situations this time delay may be undesirable.

Figure 2:
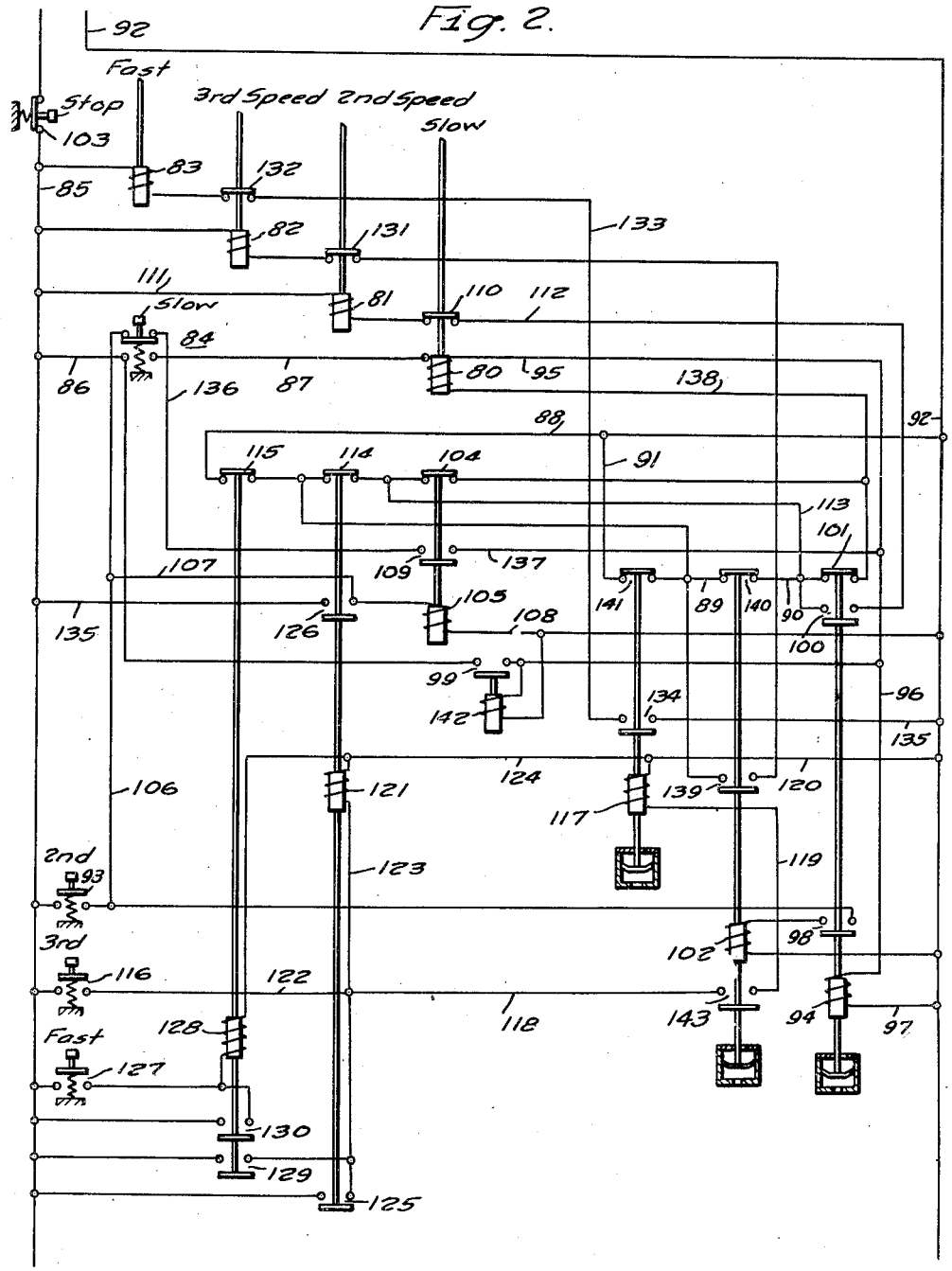
Fig. 2 is a control system involving a modification of my invention.

Fig. 2 shows a modification of the control system of Fig. 1 which is particularly adapted to installations wherein it is desired to keep the motor running at a certain speed and to transfer to higher speeds with the least possible delay. This requires an additional break-interlock on each of the control relays, but presets the timing relay on each speed for the next higher speed, so that when transferring from one speed to a higher one, one less accelerating time period than in the system illustrated in Fig. 1 is required. Referring to Fig. 2, numerals 80, 81, 82 and 83 denote the actuating coils of the "slow", "second", "third" and "fast" speed relays, respectively, which correspond exactly to actuating relays 18, 20, 22 and 24 of Fig. 1, and which are effective to change the connections of the motor windings in exactly the same manner illustrated in Fig. 1. For the sake of simplicity the motor winding circuit and its associated switches for changing the connections of the motor windings have been omitted in Fig. 2, and reference is hereby made to Fig. 1 for the showing of such circuit and switches.

The operation of the system illustrated in Fig. 2 is as follows: When the "slow" speed push button 84 is depressed a circuit is completed through the "slow" speed actuating coil 80, thereby effecting a motor winding connection which is such as to secure slow speed operation. The above circuit can be traced as follows: from conductor 85 to conductor 86, the contact members of the "slow" speed push button 84, conductor 87, actuating coil 80, conductor 138, contact member 101, conductor 90, contact members 140, conductor 89, contact members 141 through the bridged contact members of the timing relays, conductors 91 and 88 to conductor 92. At the same time another circuit is completed through the "second" speed timing relay coil 94 which may be traced as follows: from conductor 85 to conductor 86, the contact members of the "slow" speed push button 84, conductors 87, 95, 96, timing relay coil 94, conductor 97 to conductor 92. Hence while the motor is accelerating up to "slow" speed, the "second" speed timing relay operates so as to complete a preparatory circuit for higher speed operation when the "second" speed timing relay armature finally completes its upward movement at which time it will effect closure of contact members 98 and 100, and opening of contact members 101. Energization of relay coil 142 which is in parallel with coil 94 will effect closure of contact members 99. Closure of contact members 98 sets up a circuit for the "third" speed timing relay coil 102 that requires only the depression of the "second" speed push button for completion thereof. Closure of contact members 99 forms a shunt or interlock across the "slow" speed contact members of "slow speed" push button 84, thus permitting coils 80 and 94 to hold in their own energizing circuit until the source of supply is interrupted such as by depressing the "stop" push button 103. Closure of contact members 100 has no immediate effect. Opening of contact members 101 has no immediate effect since these contact members are already shunted by the "second" speed control relay contact members 104. Assume now, however, that "second" speed operation is desired. As soon as the "second" speed push button 93 is depressed a circuit is completed through the "second" speed control relay coil 105. The circuit may be traced as follows: from conductor 85 through the contact members of the "second" speed push button 93, conductors 106 and 107, the "second" speed push button 93, conductors 106 and 107, the "second" speed control relay coil 105, conductor 108 to conductor 92. Energization of coil 105 will effect closure of contact members 109 and opening of contact members 104. Closure of contact members 109 completes a shunt circuit across the "second" speed push button 94 which goes through "slow" push button contact members and contact members 99, whereas, the opening of contact members 104 effects opening of the circuit through the "slow" speed actuating relay 80, thus deenergizing the relay and effecting disconnection of the "slow" speed motor winding connection and closure of contact members 110, the latter completing a circuit through the "second" speed actuating relay coil 81 which can be traced as follows: from conductor 85 to conductor 111, coil 81, contact members 110, conductor 112, contact members 100, conductor 113, contact members 114 and 115, conductor 88 to conductor 92. Energization of coil 81 will effect motor winding connections for "second" speed operation. At the same time a circuit is completed through the "third" speed timing relay coil 102 through contact members 98 as will be obvious.

Assume now that the "third" speed of operation is desired. The "third speed" push button 116 is depressed and a circuit is completed through the "fourth" speed timing relay coil 117 which circuit can be traced as follows: from conductor 85, contact members of the "third" speed push button 116, conductors 122, 118, contact members 143, conductor 119, coil 117, conductor 120 to conductor 92. At the same time another circuit is completed through the "third" speed control relay coil 121 which can be traced as follows: from conductor 85, to contact members of the "third" speed push button 116, conductors 122 and 123, coil 121, conductors 124 and 120 to conductor 92. Energization of coil 121 effects closure of contact members 125 thus forming a shunt path across the "third" speed push button to form a holding circuit for coil 121 after push button 116 is released—it also effects closure of contact members 126 and opening of contact members 114, the former completing a circuit through the coil 105 while the latter interrupts the circuit through the "second" speed actuating coil 81, thus allowing contact members 131 to close.

Assume now that "fast" speed operation is desired. As soon as the "fast" speed push button 127 is depressed, a circuit is completed through the "fast" speed control relay coil 128 as will be obvious and the energization of which coil will effect closure of contact members 129 and 130 and opening of contact members 115. Closure of contact members 129 completes a circuit through control relay 121; closure of contact members 130 forms a shunt across the "fast" speed push button while opening of contact members 115 interrupts the circuit through the "third" speed actuating relay 82, thereby effecting disconnection of the "third" speed motor winding and at the same time closing contact members 132. Thus, a circuit is completed through the "fast" speed actuating coil to effect "fast" speed operation of the motor, which circuit may be traced from conductor 85, to actuating coil 83, contact members 132, conductor 133, contact members 134, conductor 135 to conductor 92.

Assume that it is desired to stop the motor. This is effected by depressing the "stop" push button 103 which opens up the main circuit through conductor 85 thus deenergizing all of the coils in the control circuit including the "fast" speed actuating coil.

Assume now that it is desired to accelerate the motor from rest to its "third" speed. The "third" speed push button is depressed which completes a circuit through the "third" speed control relay coil which relay, upon energization, effects closure of contact members 126.

Closure of contact members 126 forms a shunt path across the "second" speed push button 93 which, in turn, completes a circuit through the "second speed" control relay coil 105. Energization of relay coil 105 effects closure of contact members 109 which completes a circuit through the "slow" speed actuating coil to effect a motor connection for slow speed operation, and which circuit may be traced as follows: from conductor 85 to conductor 135, contact members 126, conductor 107, the contact members of the conductors 89, contact members 141, "slow" speed push button 84, conductor 136, contact members 109, conductor 137, conductor 95, actuating coil 80, conductors 138, bridged contact members 101, conductor 90, contact member 140, conductor 91 to conductor 92. At the same time another circuit is completed which follows the same path described above except that from conductor 137 it follows conductor 96 through the "second" speed timing relay coil 94. After the armature of this timing relay has completed its upward movement it will open contact members 101, thus deenergizing actuating coil 80 and will close contact members 100, which, in turn, completes a circuit through the "second" speed actuating relay 81, thus connecting the motor for second speed operation. At the same time, the "third" speed timing relay is also energized and as soon as its armature completes its upward movement it will open contact members 140, thereby deenergizing coil 81 and closing contact members 139 the latter completing a circuit through the "third" speed actuating coil 82 which, in turn, effects a motor connection which will accelerate the motor to its third speed. At the same time the "fast" speed timing relay coil 117 is also energized and as its armature completes its upward movement it opens contact members 141, but this does not deenergize coil 82 because contact members 115 are closed, but closes contact members 134. However, this does not have any effect on the "fast" speed actuating coil 83 inasmuch as contact members 132 remain open because of the energized coil 82, hence the motor will continue to operate at the "third" speed until another push button is depressed.

While four speed steps have been described it is obvious that the number of speed steps could equally be greater or less than four. Likewise, it will be obvious that any desired speed of operation may be secured when the motor is at a standstill by merely depressing the appropriate push button. Also, any higher speed of operation may be secured when the motor is running at a definite speed by merely depressing the appropriate speed push buttons.

I am, of course, aware that others, particularly after having had the benefit of the teachings of my invention, may devise other devices embodying my invention, and I, therefore, do not wish to be limited to the specific showings made in the drawings and the descriptive disclosure hereinbefore made, but wish to be limited only by the scope of the appended claims and such prior art that may be pertinent.

I claim as my invention:

1. In a system for controlling the speed of an electric motor including, in combination, an electric motor having windings, a plurality of push buttons for selectively obtaining different operating speeds of said motor, each of said push buttons being effective to secure a particular connection of said windings giving a particular speed of operation of said motor, automatic means responsive solely to the operation of a single one of said push buttons for sequentially changing said winding connections in a manner to effect progressive increase in the speed of said motor until it reaches the speed corresponding to said operated single push button.

2. In a system for controlling the speed of an electric motor including, in combination, an electric motor having windings, a plurality of push buttons for selectively obtaining different operating speeds of said motor, each of said push buttons being effective to secure a particular connection of said windings giving a particular speed of operation of said motor, automatic means responsive solely to the operation of a single one of said push buttons for sequentially changing said winding connections in a manner to effect progressive increase in the speed of said motor until it reaches the speed corresponding to said operated single push button, said automatic means including a plurality of time relays, each of which is adapted to provide a predeterminable time interval for the period of change-over from one connection of said windings to another connection of said windings, thereby providing controllable acceleration for said motor.

3. In a system for controlling the speed of an electric motor including, in combination, an electric motor having windings, a plurality of push buttons for selectively obtaining different operating speeds of said motor, each of said push buttons being effective to secure a particular connection of said windings giving a particular speed of operation of said motor, automatic means responsive solely to the operation of a single one of said push buttons for sequentially changing said winding connections in a manner to effect progressive increase in the speed of said motor until it reaches the speed corresponding to said operated single push button, said automatic means including a plurality of time relays, each of which is adapted to provide a predeterminable time interval for the period of changeover from one connection of said windings to another connection of said windings, thereby providing controllable acceleration of said motor, each of said time relays being effective to disconnect previous connections of said motor windings.

4. In a system for controlling the speed of an electric motor including, in combination, an electric motor having windings which are adapted to be connected in a plurality of different ways, a plurality of push buttons including a "slow speed" push button and a plurality of higher speed buttons, each of said buttons being effective to complete a circuit which will effect a particular connection of said windings so as to cause the motor to operate at the particular corresponding speed, a time delay relay associated with each of said higher speed buttons, said time delay relay including contact members which, upon energization of the time delay relay, complete a circuit which is effective to connect the windings so as to operate the motor at the corresponding speed, said time delay relay also including contact elements which are effective to partially complete a circuit through the time delay relay corresponding to the next higher speed.

5. In a system for controlling the speed of an electric motor including, in combination, an electric motor having windings which are adapted to be connected in a plurality of different ways, a plurality of push buttons including a "slow speed" push button and a plurality of higher speed push buttons, each of said push buttons being effective to complete a circuit which will effect a particular connection of said windings so as to cause the motor to operate at the particular corresponding speed, a time delay relay associated with each of said higher speed push buttons, said time delay relay including contact members which, upon energization of the time delay relay, complete a circuit which is effective to connect the windings so as to operate the motor at the corresponding speed, said time delay relay also including contact members which are effective to partially complete a circuit through the time delay relay corresponding to the next higher speed, a control relay associated with and operable by each of said higher speed push buttons, said control relay having interlocking contact members which are effective to providing a holding circuit for said control relay even after the push button is released.

6. In a system for controlling the speed of an electric motor including, in combination, an electric motor having windings, which are adapted to be connected in a plurality of different ways, a plurality of push buttons including a "slow speed" push button and a plurality of higher speed push buttons, each of said push buttons being effective to complete a circuit which will effect a particular connection of said windings so as to cause the motor to operate at a particular corresponding speed, a time delay relay associated with each of said higher speed push buttons, said time delay relay including contact members which, upon energization of the time delay relay, complete a circuit which is effective to connect the windings so as to operate the motor at the corresponding speed, said time delay relay also including contact members which are effective to partially complete a circuit through the time delay relay corresponding to the next higher speed, a control relay associated with and operable by each of said higher speed push buttons, said control relay having contact members which are effective, upon operation, to complete a circuit through the time delay relay corresponding to the next lower speed push button.

7. In a system for controlling the speed of an electric motor including, in combination, an electric motor having windings which are adapted to be connected in a plurality of different ways, a plurality of push buttons including a "slow speed" push button and a plurality of higher speed push buttons, each of said push buttons being effective to complete a circuit which will effect a particular connection of said windings so as to cause the motor to operate at the particular corresponding speed, a time delay relay associated with each of said higher speed push buttons, said time delay relay including contact members which, upon energization of the time delay relay, complete a circuit which is effective to connect the windings so as to operate the motor at the corresponding speed, said time delay relay also including contact members which are effective to partially complete a circuit through the time delay relay corresponding to the next higher speed, each of said time delay relays being effective, upon energization to nullify the connection of the windings of the motor corresponding to any of the lower speeds than that which is being set up by the time delay relay.

8. In a system for controlling the speed of an electric motor including, in combination, an electric motor having windings provided with a plurality of terminals thus being adapted to be selectively connected in a plurality of different ways, a plurality of push buttons including a "slow speed" push button and a number of higher speed push buttons, a relay associated with each of said push buttons and operable, upon pressing of the push button, to effect a particular connection of the motor winding so as to impart a particular speed to the motor corresponding to the push button, a time delay relay associated with each of said higher speed push buttons which is effective to interrupt a circuit through any of the lower speed relays and at the same time partially complete a circuit through the next higher speed relay so that, upon pressing said next higher speed push button a circuit will be completed so as to effect connection of said windings so as to impart the next higher speed of operation thereto.

9. In a system for controlling the speed of an electric motor including, in combination, an electric motor having windings provided with a plurality of terminals thus being adapted to be selectively connected in a plurality of different ways, a plurality of push buttons including a "slow speed" push button and a number of higher speed push buttons, a relay associated with each of said push buttons and operable, upon pressing of the push button, to effect a particular connection of the motor winding so as to impart a particular speed to the motor corresponding to the push button, a time delay relay associated with each of said higher speed push buttons which is effective to interrupt a circuit through any of the lower speed relays and at the same time partially complete a circuit through the next higher speed relay so that, upon pressing said next higher speed push button a circuit will be completed so as to effect connection of said windings so as to impart the next higher speed of operation thereto, said time delay relay carrying additional contact element which are effective to partially complete a circuit through the time delay relay corresponding to the next higher speed.

10. In a system for controlling the speed of an electric motor including, in combination, an electric motor having windings provided with a plurality of terminals thus being adapted to be selectively connected in a plurality of different ways, a plurality of push buttons including a "slow speed" push button and a number of higher speed push buttons, an actuating relay associated with each of said push buttons and operable, upon pressing of the push button, to effect a particular connection of the motor winding so as to impart a particular speed to the motor corresponding to the push button, a control relay associated with each of said higher speed buttons which carries contact members which are effective to providing a holding circuit through the control relay which is operative to maintain energization of the control relay after the push button is released and which contact members are effective to partially complete a circuit through the actuating relay corresponding to the particular push button speed and to complete another circuit through the control relay corresponding to the next lower speed push button, a time delay relay associated with each of said higher speed push buttons which is effective to interrupt a circuit through any of the lower speed actuating relays and at the same time partially complete a circuit through the next higher speed time delay relay so that, upon pressing said next higher speed push button a circuit will be completed so as to effect connection of said windings so as to impart the next higher speed of operation thereto.

11. In a system for controlling the speed of an electric motor including, in combination, an electric motor having windings provided with a plurality of terminals so as to be adapted for selective connection, a plurality of push buttons including a "slow speed" push button and a number of different higher speed push buttons, an actuating relay associated with said slow speed push button which relay is effective, upon energization, to complete connections of said windings for slow speed of operation of said motor, a control relay and a time delay relay associated with each of said higher speed push buttons, said control relay carrying contact members which are effective to provide a shunt path across the corresponding push button and carrying additional contact members which are effective to complete a circuit through the next lower speed control relay, said time delay relay carrying contact members which are effective to complete a circuit through the corresponding actuating relay and carrying other contact members which are effective to interrupt the circuit through the next lower speed actuating coil and carrying still additional contact members which are effective to partially complete a circuit through the next higher speed time delay relay, said last mentioned circuit being completed by depressing the corresponding next higher speed push button, whereby automatic acceleration beginning from slow speed is obtained by pressing any of the higher speed push buttons, which acceleration is arrested only when the motor reaches the speed corresponding to the particular push button which is pressed, and whereby if the motor is already operating at a particular speed and a higher speed push button is depressed automatic acceleration from said particular operating speed to said higher speed is obtained.

KURT MAHNKE.